(12) United States Patent
Shakman et al.

(10) Patent No.: US 7,415,375 B2
(45) Date of Patent: Aug. 19, 2008

(54) SYSTEMS AND METHODS FOR FOOD WASTE MONITORING

(75) Inventors: Andrew R. Shakman, Portland, OR (US); Stephen A. Rogers, Portland, OR (US); William D. Leppo, Hillsboro, OR (US)

(73) Assignee: Leanpath, Inc., Portland, OR (US)

(*) Notice: Subject to any disclaimer, the term of this patent is extended or adjusted under 35 U.S.C. 154(b) by 532 days.

(21) Appl. No.: 11/184,765

(22) Filed: Jul. 19, 2005

(65) Prior Publication Data

US 2006/0015289 A1 Jan. 19, 2006

Related U.S. Application Data

(60) Provisional application No. 60/589,169, filed on Jul. 19, 2004.

(51) Int. Cl.
*G06F 17/60* (2006.01)
(52) U.S. Cl. .................. 702/101; 702/102; 715/764; 700/96; 345/440; 705/7; 705/15
(58) Field of Classification Search ......... 702/101–102, 702/187–188; 715/764; 700/96; 345/440; 705/7, 15
See application file for complete search history.

(56) References Cited

U.S. PATENT DOCUMENTS

| | | | |
|---|---|---|---|
| 5,173,866 A * | 12/1992 | Neumann et al. | 702/188 |
| 2003/0150908 A1* | 8/2003 | Pokorny et al. | 235/375 |
| 2004/0107141 A1 | 6/2004 | Conkel et al. | 705/15 |
| 2005/0060214 A1 | 3/2005 | Theel et al. | 705/7 |

OTHER PUBLICATIONS

Findlay, Thomas, "Catering Waste Management Systems" pp. 1-4.*
Brochure by Thomas Findlay, "Catering Waste Management Systems." May 2004, 4 pgs.

* cited by examiner

*Primary Examiner*—Tung S Lau
*Assistant Examiner*—Sujoy K Kundu
(74) *Attorney, Agent, or Firm*—Kory D. Christensen; Stoel Rives LLP (57) ABSTRACT

A food waste monitoring system and related methods are disclosed. The food waste monitoring system may include a local food waste monitoring device that is coupled to an electronic scale for weighing food waste. The monitoring device may capture and record the weight of food waste as well related information, such as the type of food wasted, the reason for the food becoming waste, the user weighing the food waste, and the type of container the food waste is weighed in. The system may also include a host device in communication with the local monitoring device that provides remote configuration and control of the local monitoring device.

19 Claims, 9 Drawing Sheets

SYSTEMS AND METHODS FOR FOOD WASTE MONITORING

RELATED APPLICATIONS

This application claims the benefit of U.S. Provisional Patent Application Ser. No. 60/589,169, filed Jul. 19, 2004 and entitled ENHANCED FOOD WASTE CONTROL SYSTEM, which is incorporated herein by reference.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Reference is now made to the figures in which like reference numerals refer to like elements. For clarity, the first digit of a reference numeral indicates the figure number in which the corresponding element is first used. While the various aspects of the embodiments disclosed are presented in drawings, the drawings are not necessarily drawn to scale.

In the following description, numerous specific details of programming, software modules, user selections, network transactions, database queries, database structures, etc., are provided for a thorough understanding of various embodiments of the systems and methods disclosed herein. However, those skilled in the art will recognize that the systems and methods disclosed can be practiced without one or more of the specific details, or with other methods, components, materials, etc.

In some cases, well-known structures, materials, or operations are not shown or described in detail. Furthermore, the described features, structures, or characteristics may be combined in any suitable manner in one or more embodiments. It will also be readily understood that the components of the embodiments as generally described and illustrated in the figures herein could be arranged and designed in a wide variety of different configurations.

The order of the steps or actions of the methods described in connection with the embodiments disclosed may be changed as would be apparent to those skilled in the art. Thus, any order in the figures or detailed description is for illustrative purposes only and is not meant to imply a required order.

Several aspects of the embodiments described will be illustrated as software modules or components. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Figure 1:
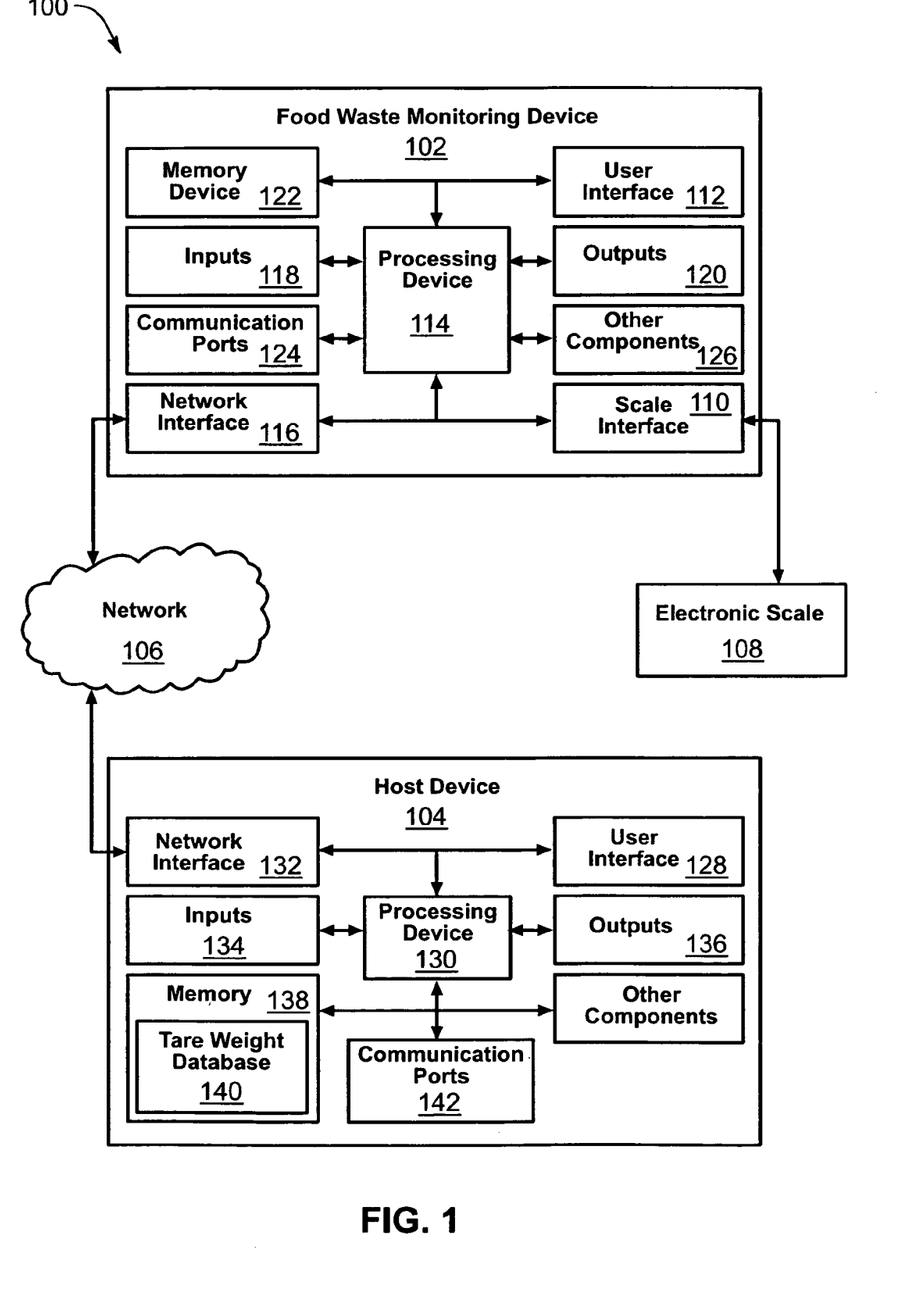
FIG. 1 is a block diagram illustrating hardware components of one embodiment of a food waste monitoring system.

FIG. 1 is a block diagram illustrating some of the hardware components of one embodiment of a food waste monitoring system 100. Food waste may occur due to several factors, such as overproduction, trimmings, overcooking and expiration of food. The food waste monitoring system 100 enables food service managers to track the amount of food waste before it is discarded as well as collect descriptive information about the waste. The food waste monitoring system 100 is typically employed to measure pre-consumer food waste, however it may be used to measure post-consumer waste if it is desirable to determine a total waste measurement for a food service operation.

In one configuration, the food waste monitoring system 100 includes a food waste monitoring device 102 in communication with a host device 104 that may be located remotely from the food waste monitoring device 102. The monitoring device 102 and host device 104 may be in electronic communication with each other through a communications network 106. As will be discussed in greater detail in conjunction with FIG. 2, communication between the host device 104 and the local monitoring device 102 may be through a wired data network, a wireless system, or by physically transporting a removable memory storage device, such as a thumb drive.

The food waste monitoring system 100 also includes an electronic scale 108 for weighing food waste. The scale 108 is in electronic communication with the local food waste monitoring device 102 through a scale interface 110. The term "electronic scale" encompasses the use of analog scales when an analog to digital converter is included within the system 100 to convert the signals from the scale into usable electronic weight data.

As depicted in FIG. 1, the electronic scale 108 may be a component separate from, but located near the local monitoring device 102. Alternatively, the electronic scale 108 may be integrated within a housing of the local monitoring device 102. The local monitoring device 102 may optionally power the scale 108 via a power cable. Alternatively, the electronic scale 108 may derive its power from an external source, and the local monitoring device 102 may, in turn, derive its power from the scale 108. The weight data from the scale 108 may be transferred to the local monitoring device 102 via wires bundled with the power cable.

In addition to receiving an indication of a weight of food waste placed upon the electronic scale 108, the local food waste monitoring device 102 also includes a user interface 112 which may prompt for and receive input from a user operating the food waste monitoring device 102. For example, the user interface 112 may include a touch screen or an array of membrane or mechanical buttons for receiving input from a user. Additionally, the user interface 112 may include a graphical or character display, such as in the form of a color, monochrome, or LCD display. The various forms of input that the user interface 112 may prompt for and/or receive from a user will be discussed in greater detail in conjunction with the discussion accompanying FIG. 3.

The local monitoring device 102 includes a processing device 114 for processing input received from the electronic scale 108, user interface 112 and other devices and components. The processing device 114 is in electronic communication with a network interface 116, which may be used for communicating with the host device 104 through the communications network 106.

The processing device 114 may also be in electronic communication with standard input components 118 and output components 120 not specifically described herein. The input 118 and/or output 120 components may communicate with the processing device 114 through an electrical signal.

The food waste monitoring device 102 also includes a memory storage device 122 for storing, among other things, the indications of weight from the food waste placed on the electronic scale 108 and/or the inputs received from the user through the user interface 112. The memory device 122 may also store software or executable instructions, that may include an operating system such as Linux, Windows CE, Windows XP Embedded, etc., as well as application software. Examples of application software include software to operate and configure the user interface 112, and a database to store configuration data, user input data, and weight data.

The memory device 122 may be a separate component from the processing device 114, or may be on-board memory included in the processing device 114. For example, microcontrollers may include a certain amount of on-board memory. The memory device 122 may be removable or located as a separate component from the food waste monitoring device 102.

The local food waste monitoring device 102 may also include other communication ports 124 and/or other components 126 not enumerated herein. For example, a printer or printing peripheral may be in electronic communication with the monitoring device 102 through a serial, parallel, or USB port. The monitoring device 102 may include an integrated or an auxiliary graphical display and/or a speaker that may allow for a range of audio output, such as beeps or the rendering of digital audio samples.

The food waste monitoring device 102 may receive power from an AC/DC transformer, directly from AC, or from batteries located within the monitoring device 102 or the scale 108. The monitoring device 102 may comprise a plastic and/or metal enclosure that encases a single board computing device. Additionally, other printed circuit boards may also be included to perform the aforementioned analog to digital conversion of scale weight data, power supply, inputs 118 and outputs 120, digital to analog conversion for audio output, USB ports for data transfer, and/or compact flash and RAM.

Referring still to FIG. 1, the host device 104 may have hardware components similar to those of the monitoring device 102, such as a user interface 128, a processing device 130, and a network interface 132 for communicating with the local monitoring device 102 through the communications network 106. Also similar to the monitoring device 102, the host device 104 may include other input components 134 and output components 136 in electronic communication with the processing device 130.

The host device 104 also includes memory 138 for, among other things, storing software or executable instructions that enable users, such as kitchen managers, to customize aspects of the food waste monitoring system 100. For example, the software stored on memory 138 may establish various defaults and customization choices as well as populating databases of users and administrators, register passwords, set-up and identify local food waste monitoring devices 102. The software included on memory 138 may provide instructions that are transmitted to the local food waste monitoring device 102 to change configuration parameters as will be discussed in greater detail in conjunction with FIG. 4.

Figure 7:
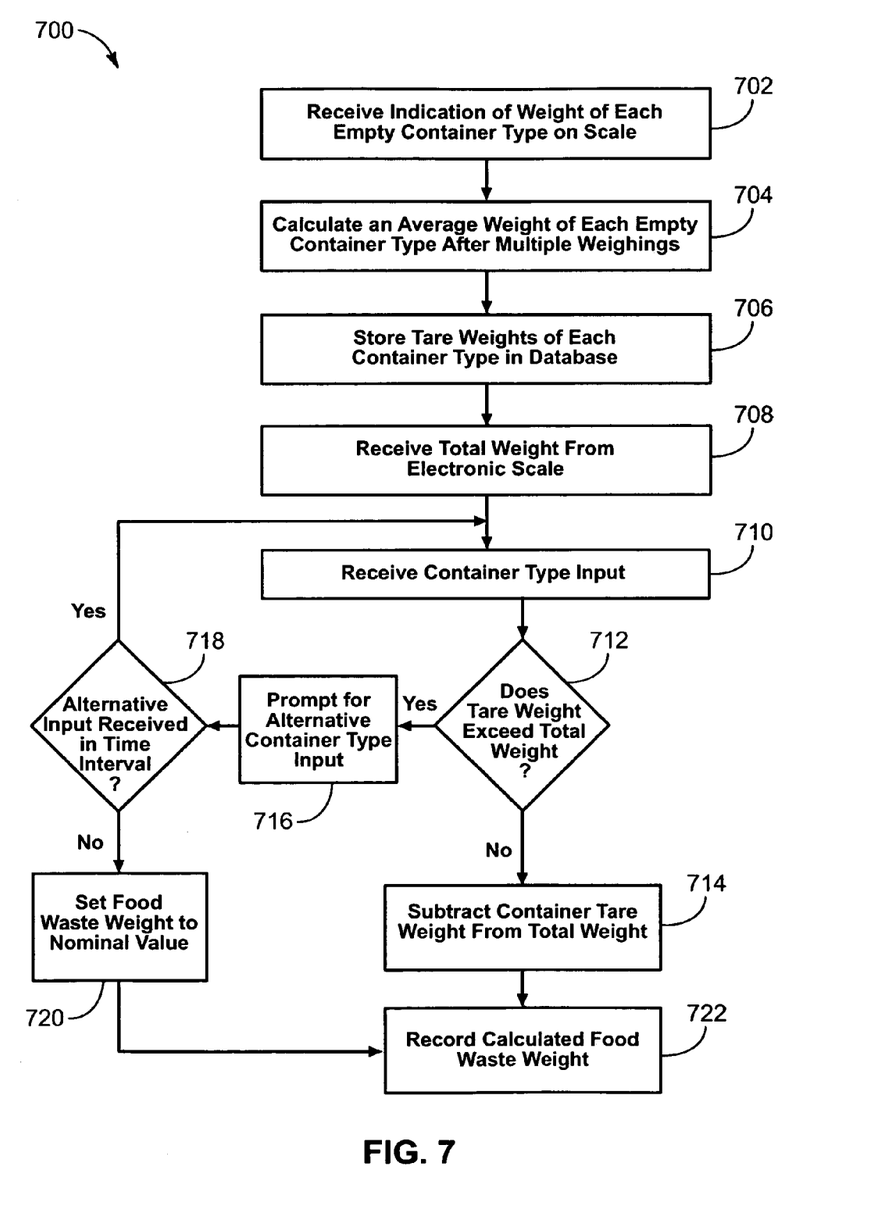
FIG. 7 is a flow diagram of one embodiment of a method for automatically deducting a container weight during a food waste weighing event.

The host device memory 138 may also include a container tare weight database 140 that will also be discussed in greater detail in conjunction with FIG. 7. Like the monitoring device 102, the host device 104 may also include other communication ports 142 and/or other components 143 not enumerated herein.

Figure 2:
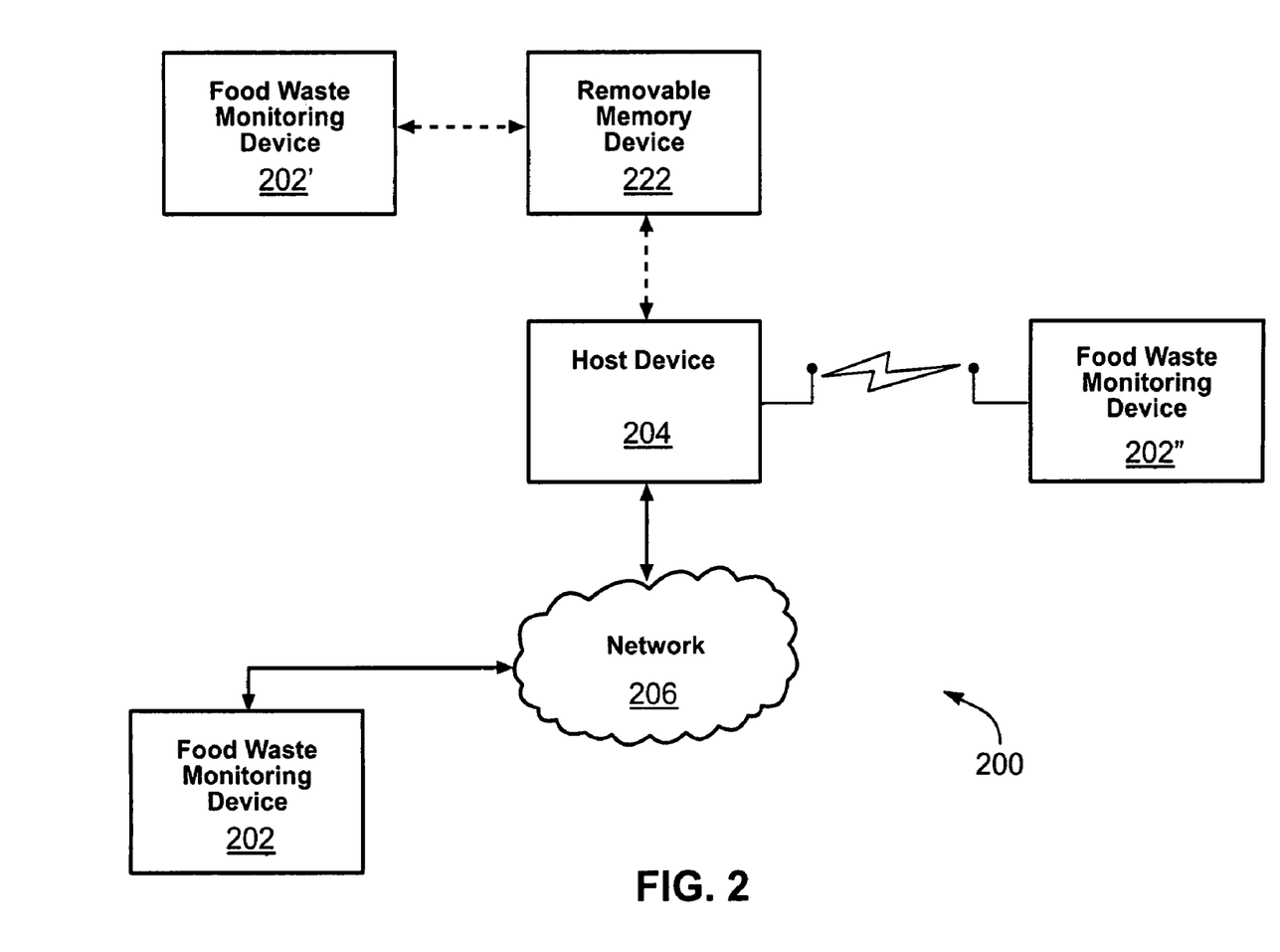
FIG. 2 is a block diagram of another embodiment of a food waste monitoring system.

FIG. 2 is a block diagram of an alternative embodiment of a food waste monitoring system 200. According to the system 200 depicted, a central host device 204 is in communication with several food waste monitoring devices 202, 202', 202", each being located at a different location. The central host device 204 may provide configuration data or instructions that are transmitted to all or a particular remote food waste monitoring device 202, 202', 202".

Additionally, the host device 204 is able to receive and aggregate waste data from each food waste monitoring device 202, 202', 202" for later analyses as will be discussed in greater detail in conjunction with FIG. 4. For example, each food waste monitoring device 202, 202', 202" may be assigned a specific name, serial number, address, etc., that can be recognizes by the host device 204. Therefore, inbound data may be correlated with the correct food waste monitoring device 202, 202', 202".

Data transfer between host 204 and monitoring devices 202, 202', 202" may be accomplished in a variety of ways depending upon the environment and business needs of each user. For example, data may be transmitted between food waste monitoring device 202 and the host device 204 via a wired data network 206. The wire line connection may use an Ethernet standard or other network transmission standards not yet invented. Furthermore, the transmission of data between host 204 and monitoring device 202 may be in real time across the communications network 206.

By way of example, data may be transferred between food waste monitoring device 202' and the host device 204 through a removable memory device 222. Data may be copied or moved from monitoring device 202' or host device 204 onto the removable memory device 222 and then physically transported by a user or other method of transport to the host device 204 or monitoring device 202', respectively. The removable memory device 222 may be a removable memory card of monitoring device 202'. Alternatively, the removable memory device 222 may be a separate memory device such as a USB key or USB thumb drive, a floppy diskette, a data CD or DVD, an iButton storage device, compact flash, memory stick, SD RAM, Zip/Jazz drives, or other removable devices that store data.

According to another example, data may transmitted between food waste monitoring device 202" and the host device 204 wirelessly via a wireless data network using various standards, such as 802.11 (b, g, WIMAX, etc.), or other wireless standards not yet invented. Data may be transmitted from the monitoring device 202" to the host device 204 through a wireless transceiver (within or coupled to the monitoring device 202"). The wireless signal may be received directly by a transceiver coupled to or within the host device 204, or may be received by a wireless network access point connected to a local area network that is connected to the host device 204.

The infrastructure and requirements of the operating environment may dictate what type of data transmission is employed between the host device 204 and the food waste monitoring devices 202, 202', 202". For example, some institutional kitchens are located in hospitals where wireless protocols may be inappropriate given the use of sensitive medical equipment in proximity to the monitoring device. Therefore, in this example, a wire line or manual memory device transfer would likely be employed.

Figure 3:
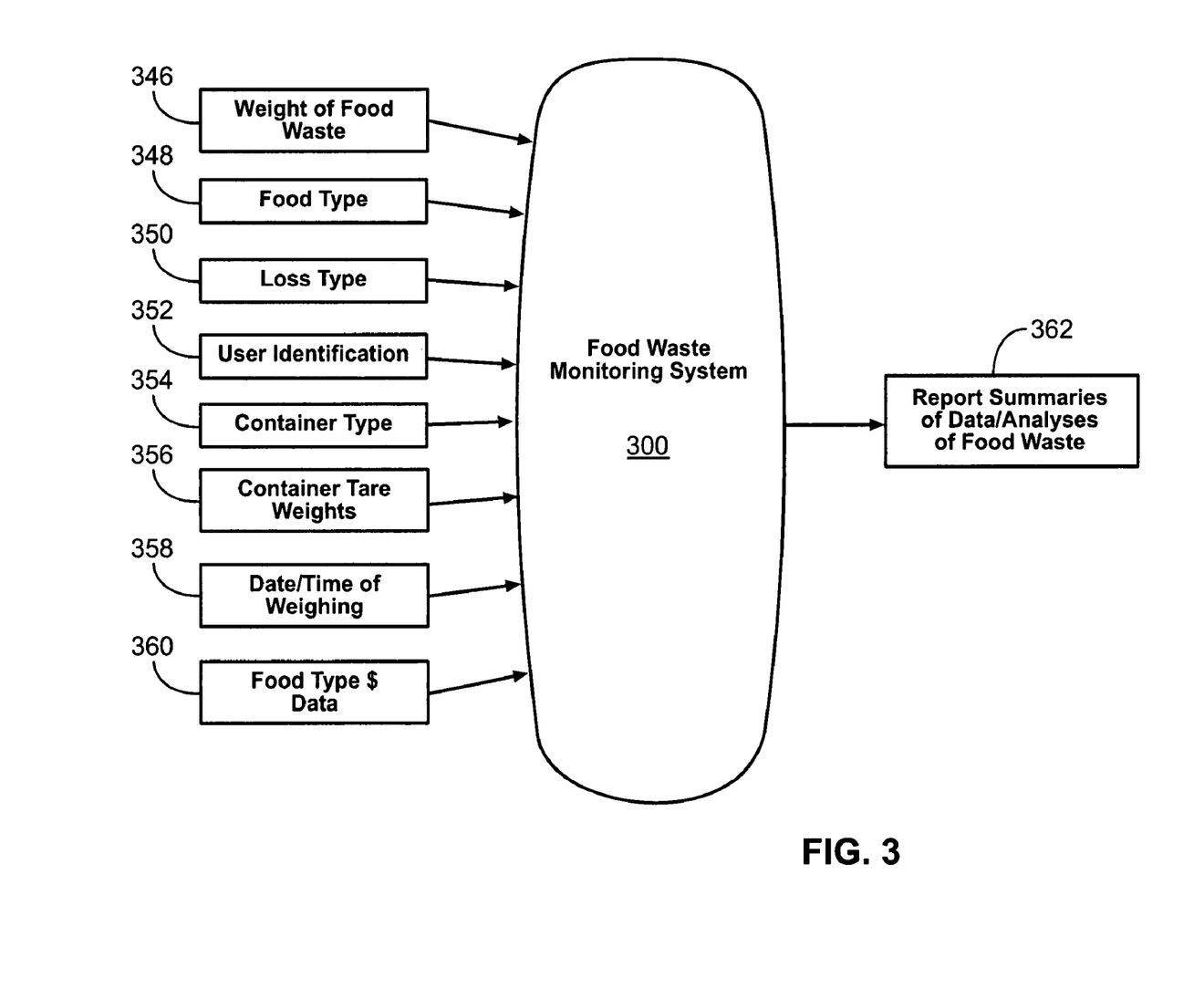
FIG. 3 is a block diagram of a system for monitoring food waste.

FIG. 3 is a block diagram of a system 300 for monitoring food waste, employing a food waste monitoring method that will be described in greater detail in the figures that follow. The system 300 for monitoring food waste receives a weight of food waste 346 that may be captured through an electronic scale. The units representing the weight of food waste 346 may be in pounds or kilograms.

Another input to the food waste monitoring system 300 is a food type 348, i.e., a category of food that has become waste. Exemplary food types 348 may include meat, dairy, bakery, frozen, produce, grocery, etc. Furthermore, a user may define a custom food type 348 as desired. Typically, the food type 348 input is captured through user input to a food waste monitoring device.

Moreover, the food type 348 may be hierarchically organized into food categories and specific types of food within the food categories. For example, meat may be a food category that comprises several types of meat, such as beef, chicken, lamb, pork, etc. Furthermore, the type of meat may be placed into sub-categories, such as ground for beef. Consequently, the food type 348 input may be hierarchically organized nested data in a string, such as meat.beef.ground, which is a single word identifying categorical relationships of food types 348. This method for organizing data may be used to transform a relational database management system ("RDBMS") into a flat file for transfer of data from a host device to the food waste monitoring device. Using hierarchical food types 348 may accelerate the waste collection process by allowing users to drill down within food type categories to select food items with specificity.

A loss reason or loss type 350 representing a reason for the food becoming waste may also be included as an input to the system 300. Categories of loss types 350 may include overproduction, burned, spilled, dropped, contaminated, trim waste, expired, etc. Furthermore, according to one embodiment, users may define custom loss types 350. The loss type or loss reason 350 may be captured through user input to the food waste monitoring device.

User identification 352 is also inputted to the system 300 for monitoring food waste. The user identification 352 may identify the kitchen staff member that is responsible for weighing the food waste during a particular weighing event. User identification 352 may be captured by input from the user in the form of a user identification code and/or password, or in alternative embodiments, selection from a list of possible users.

Another form of input into the system 300 for monitoring food waste may include a container type 354. Food waste is typically placed in a container before being weighed on the scale. The container type 354 may range from heavy kitchen trays to plastic and paper containers. In some embodiments the weight of food waste 346 reported by the scale may include the weight of the container in addition to the food waste placed therein. By inputting the container type 354, the food waste monitoring system 300 may be able to calculate the actual weight of food waste 346, not including the weight of the container. The container type 354 may be captured through user input to the food waste monitoring device.

In conjunction with the container type 354 input, container tare weights 356 may also be inputted into the system 300. This enables the maintenance of a database of container tare weights 356, which, when used in conjunction with the container type 354 input, may allow the food waste monitoring system 300 to calculate the actual weight of food waste 346, absent the weight of the container without having to conduct a tare with every weighing. A method for automatically deducting container weights, is discussed in greater detail in conjunction with FIG. 7.

A date/time indicator 358 of a weighing event may also be inputted into the system 300 for monitoring food waste. The date/time 358 input represents the date and time of the weighing event, which is typically generated internally by local monitoring device software. For example, a real-time clock located on the local monitoring device may provide the date/time input 358. Alternatively, the real-time clock may be located at the host device, or an alternative location as would be apparent to those having skill in the art.

Another possible input to the food waste monitoring system 300 may include food type monetary data 360. In order to extrapolate food waste weights into a monetary value, it may be desirable to provide food type monetary data 360. Food type monetary data 360 represents the monetary value of a particular weight of food type 348. For example, a monetary value of $2 per pound may be assigned to bakery waste, while $4 per pound may be assigned to meat waste. Therefore, 4 pounds of bakery waste yields a food cost of $8 for that particular waste.

Other forms of user input into the food waste monitoring system 300 not specifically enumerated above may also be entered as would be apparent to those having skill in the art, such as a disposal type representing whether food waste was disposed of in the garbage or down a garbage disposal, etc.

The food waste monitoring system 300 may then provide reports/summaries 362 of data and/or analyses performed on the food waste data. Kitchen managers may use the reports 362 provided to identify areas where improvement is needed or achieved in food waste reduction. Furthermore, the reports 362 provided may be customized to fit the needs of the user. Examples of reports 362 generated include the cost of food over a time interval, comparisons of various user inputs over several time intervals, and kitchen staff activity, which may track particular individuals, shifts, or classes of employees for purposes of recognition and/or compliance with the food waste reduction program. The reports 362 generated will be discussed in greater detail in conjunction with FIG. 4.

Figure 4:
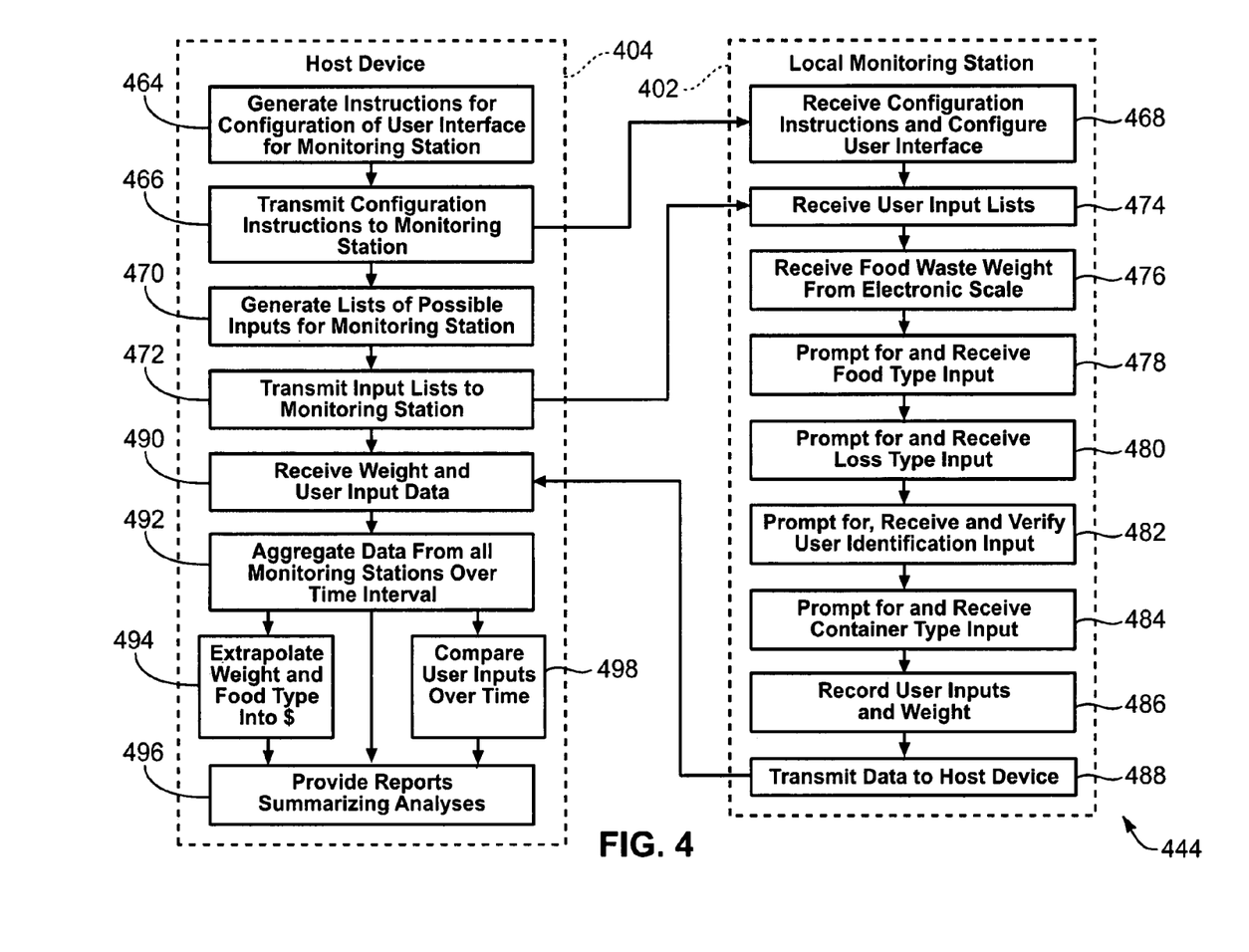
FIG. 4 is a flow diagram of one embodiment of a method for monitoring food waste within a host device and a local food waste monitoring station.

FIG. 4 is a flow diagram of one embodiment of a method 444 for monitoring food waste within a host device 404 and a local food waste monitoring station 402. This method 444 may be practiced in combination with an electronic scale, one or several local food waste monitoring stations 402, and a host device 404 in order to give food service managers information that may be helpful in reducing food costs by controlling waste.

The host device 404 may generate 464 instructions for the configuration of a user interface on one or several local monitoring stations 402. The user interface configuration may effect: the sequence of prompting for user input, which features are enabled or disabled on the local monitoring station 402, system use parameters such as time out intervals, types of data collected, training content, incentive features and content, display choices, user interface options, and any other configuration parameters that may effect any element of the operation of the local monitoring device 402. By way of example, other configuration instructions may effect the data backup practices on the local monitoring station 402 (including the keeping of zero, one or more backup data buffers), the availability and type of training offerings at the local monitoring station 402, the availability and type of incentives for compliance with the food waste monitoring program, whether to require printing after each weighing event, etc.

Configuration instructions may be transmitted 466 to the local monitoring station 402 using XML, or the methods of transmission discussed in detail in conjunction with FIG. 2. The configuration instructions are then received 468 by the local monitoring station 402 via a memory storage device, wireless or wireline network, etc.

The method 444 for monitoring food waste may also include generating 470, at the host device 404, lists of possible user inputs to the local monitoring station 402. For example, specific food and loss types are selectable at the local monitoring station 402 from predefined lists of food types and loss types generated 470 at the host device 404. Generating 470 lists may include allowing a food service manager to create and change basic and custom food and loss codes, operator identification codes, and container type codes.

Depending on the desire of the food service manager, the weighing operation may be more or less streamlined to collect more or less data from a kitchen staff member weighing food waste at the local monitoring station 402. The manager may elect to require each user to enter an operator identification code before weighing waste so as to be able to record the participation of staff members. A list of authorized user codes may be generated 470 at the host device and then transmitted 472 to the local monitoring station 402. Alternatively, the manager may choose to omit operator codes to enhance the speed of the weighing process. Therefore, in this example, the generation 470 of lists of possible inputs would not include a list of authorized user codes as desired by the food service manager. Other examples of various input list configuration instructions may include the requirement to capture food codes, loss codes, user identification passwords, etc.

The generation 464 of user interface configuration instructions and the generation 470 of lists of possible inputs to the monitoring station 402 allows for remote configuration and control of one or several local monitoring stations 402 by the host device 404. This provides a flexible system that may be updated by food service managers to adapt user inputs to reflect various food waste reduction strategies at different times. In some embodiments, the configuration instructions and possible input lists may be transmitted 466, 472 in real-time to the local monitoring station 402 over a communication network.

The various input lists generated 470 at the host device 404 are received 474 by the local monitoring station 402 and the user interface program is updated accordingly. The method 444 for monitoring food waste continues with the local food waste monitoring station 402 receiving 476 an indication of weight of food waste from an electronic scale in communication with the local monitoring station 402.

During a weighing event, the local monitoring station 402 may prompt 478 a user for a food type input, as heretofore described, and thereafter receive that input. The method 444 may also include the local monitoring station 402 prompting 480 a user for a loss reason or loss type input, as heretofore described, and receiving that input. The local monitoring station 402 may also prompt for 482, receive and verify a user identification input, such as a user identification code and/or password. In addition, the local monitoring station 402 may also prompt for 484 and receive a container type input from the user. These user inputs may be captured through a user interface at the local monitoring station 402.

The user inputs and the indication of weight of the food waste are then recorded 486 in a memory storage device. Other inputs may be recorded as well, such as a date/time stamp indicating the date/time of the weighing event. Upon recording 486 the user inputs, weight indication and other information such as the date/time stamp, the data are transmitted 488 to the host device 404 in real-time over a communications network, or in batch mode at a later time depending upon the particular embodiment of the system.

The host device 404 receives 490 the weight and user input data from a particular local monitoring station 402. The host device 404 may receive 490 food waste weight and user input data from a plurality of local monitoring stations 402. The host device 402 aggregates 492 the data from all local monitoring stations 402, or from a particular individual or group of stations, over a time interval. The time interval may be user selected and the data having date/time stamps corresponding within the selected time interval are aggregated 492. The local monitoring station data may be aggregated 492 within a database on the memory of the host device 404, or alternatively on a separate storage device.

The host device 404 may use the aggregated 492 data to provide 496 pre-formatted or custom analytic reports regarding the data. For example, the aggregated 492 food waste weight and food type data received 490 from the local monitoring stations 402 may be extrapolated 494 into a monetary value. The data from the local monitoring station 402 includes food waste weight, but it may not include food cost. The method 444 may calculate food cost by multiplying the weight of the food waste by the cost per unit weight for a particular food category, as defined by a food service manager. The cost per unit weight for a particular food category may be inputted to the host device 402 at some earlier time. By way of example, a monetary value of $2 per pound may be assigned to bakery waste, while $4 per pound may be assigned to meat waste. Therefore, four pounds of bakery waste yields a food cost of $8 for that particular waste, while four pounds of meat waste yields a food cost of $16 for that particular waste. In some embodiments, when no food type data is available from the weighing events, the method 444 may default to the average cost for all food types, which may be a figure also provided by the food service manager.

With the food waste weight and food type data extrapolated 494 into food cost, the method 444 may provide 496 a report which maps food costs over time (i.e., over days, weeks, months, etc.). The report may be customized to show only the food waste logged by a specific kitchen staffer or only the food waste weighed at a particular local monitoring station 402. The report may also be customized to show food cost by a specific loss type or food type over a time interval. By way of example, a report may show food cost for two preceding months, on weekly intervals, for food waste due to overproduction.

Alternatively, the aggregated 492 user input data from the local monitoring stations 402 may be compared 498 over a time interval. By way of example, a report may be provided 496, which compares food waste trends across specific categories, such as loss reason or type, food type, days of the week, etc., all mapped over a period of time. Alternatively, the food cost extrapolation 494 and comparison 498 data may be combined to provide food cost trends across specific user input categories. Alternative reports may be prepared 496 as would be apparent to those having skill in the art, such as reports keeping track of food waste weighed by individual users, shifts, or classes of employees for purposes of recognition and monitoring compliance with the food waste reduction plan.

Figure 5:
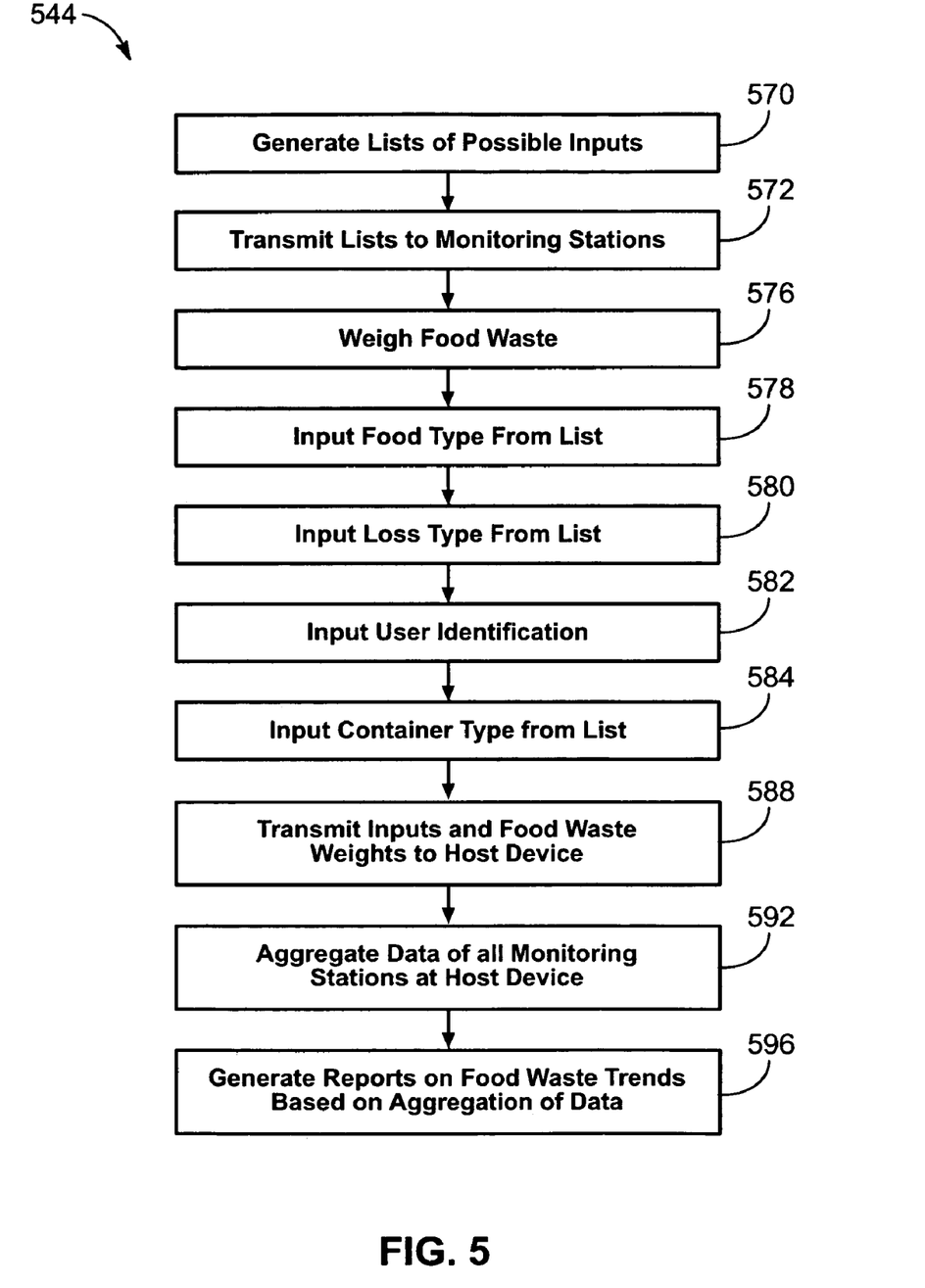
FIG. 5 is a flow diagram of one embodiment of a method for monitoring food waste by a user.

FIG. 5 is a flow diagram of one embodiment of a method 544 for a user to monitor food waste in accordance with the methods and systems disclosed. At a host device, a user may generate 570 a list of possible user inputs that the same or another user may choose from at a food waste monitoring station during a food waste weighing event. For example, the predefined list of possible user inputs may include a list of food and loss types from which a user may select a particular food type or loss type on the list corresponding with the food and loss type of the food waste.

A user may then transmit 572, which includes causing to be transmitted, the predefined user input lists from the host device to the local monitoring stations. At the local monitoring station, another user, or possibly the same user from the host device, may determine that waste is to be disposed, whereupon the user weighs 576 the food waste on an electronic scale in communication with the local monitoring station.

In conjunction with the weighing 576 event, the user may input 578 a food type representing a category of food that has become waste. The food type may be selected from the predefined lists transmitted 572 from the host device to the local monitoring station. Exemplary food types may include meat, dairy, bakery, frozen, produce, grocery, etc.

Additionally, a user may input 580 a loss reason or loss type representing a reason for the food becoming waste. Exemplary categories of loss reasons or loss types may include overproduction, burned, spilled, dropped, contaminated, trim waste, expired, or other pre-defined or custom lost types.

The method 544 may also include a user inputting 582 user identification to identify the kitchen staffer responsible for weighing 576 the food waste during a particular weighing event. User identification may be in the form of a user identification code and/or password, or through selection from a list of authorized users.

A user may also input 584 a container type from a list of possible food waste containers. The container type represents the container in which the food waste is weighed. Food waste is typically placed in a container before being weighed 576. Consequently, weighing 576 the food waste may include weighing both the container and the food waste therein. By inputting 584 the container type, the tare weight of the container may be subtracted from the total weight, arriving at the actual food waste weight.

The method 544 may also include the step of transmitting 588 the user inputs, waste weight, and other indicia of the weighing event, such as a date/time indication, from the local monitoring station to the host device. Transmitting 588 includes actually physically transporting a removable memory device containing the input and weight data from the local monitoring station to the host device. Alternatively, transmitting 588 may include providing for the transmission of the data over a wired communications network or wireless network.

The user input data and the waste weight data from all local monitoring stations are then aggregated 592 at the host device. This step may be performed by another user, such as a food service manager, instead of a kitchen staffer who is typically involved with the weighing events. The user may then generate 596 reports regarding food waste trends based on the data aggregated 592. The reports generated 596 may be similar to those described in detail in conjunction with FIG. 4.

Figure 6A:
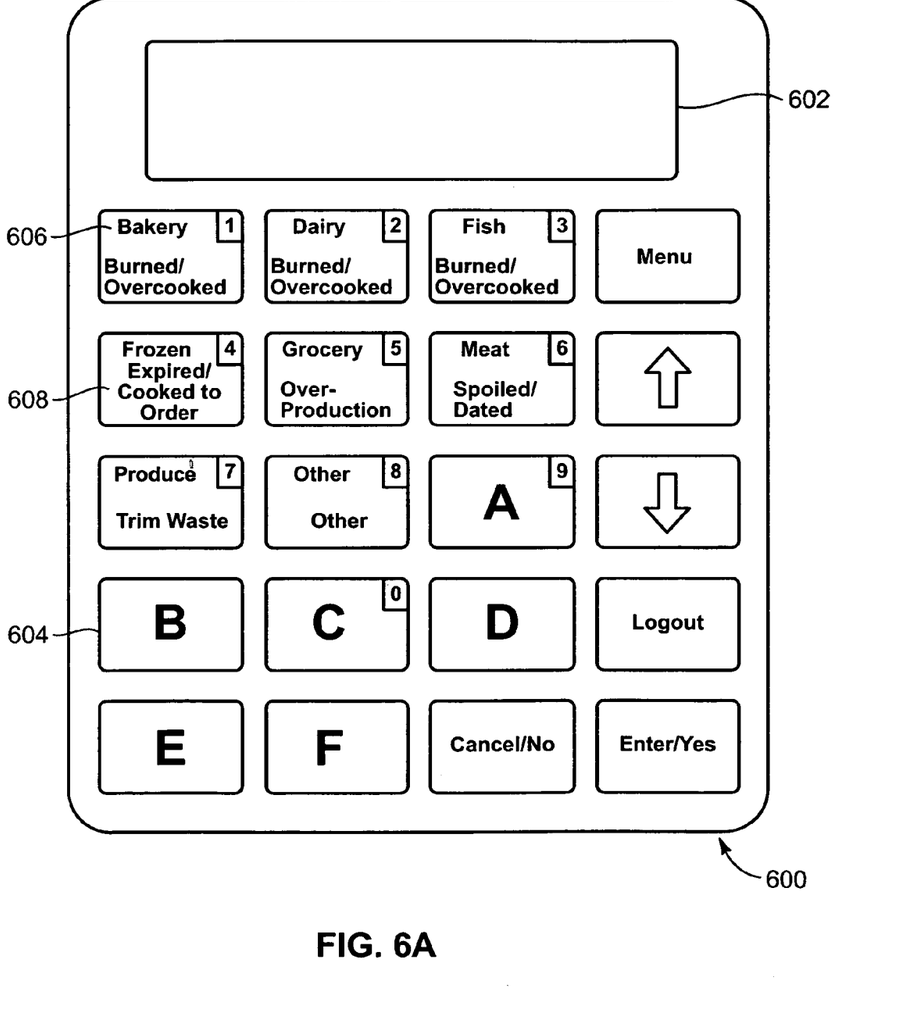
FIG. 6A is a graphical representation of one embodiment of a user interface at a local food waste monitoring station.

FIG. 6A is a graphical representation of one embodiment of a user interface 600 at a local food waste monitoring station. The user interface 600 depicted includes a display area 602 and a soft button 604 interface. The display area 602 is where prompts and instructions are presented to the user. The display area 602 may optionally include the display of system and process information. For example, the display area 602 may indicate whether the user is at step 1 of 4, or step 2 of 4, etc. of the particular weighing event. The display area 602 may display the current time, the present weight registered on the electronic scale, the operator identification currently logged into the device, and other information that may provide context, information and orientation to the user.

As the software causes the display area 602 to change, the meanings ascribed to each button 604 change in turn. For example, during one step of the weighing event the a particular food type 606 is inputted when the relevant button 604 is pushed. During another step, pushing a button 604 provides input regarding a loss reason or type 608 of the food waste. As such, the user interface 600 is flexible and able to be modified without printing new overlays for button labels. In alternative configurations, touch screen buttons and hard buttons may be used along with the soft buttons 604.

Figure 6B:
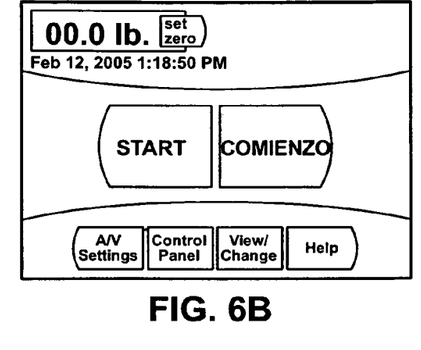
FIGS. 6B-6G are a graphical representation of another embodiment of a user interface at a local food waste monitoring station.

FIG. 6B is a graphical representation of another embodiment of a user interface at a local food waste monitoring station before a weighing event. The user interface depicted is a touch screen interface configured as a wizard. The touch screen interface has a graphic display with a touch sensitive membrane. The user interface may include "buttons" for receiving user input. The touch screen buttons are graphical representations of buttons displayed on the touch screen. The touch screen recognizes the input and reacts as if a physical button push were detected. A touch screen may also be used in combination with both hard and soft buttons as desired. As shown in FIG. 6B, the display area of the user interface may include an area for displaying the current weight placed upon an electronic scale. The display area may also include an area for displaying the date and time according to a real-time clock. A start button may also be included to begin a weighing event and advance to the next screen.

Figure 6C:
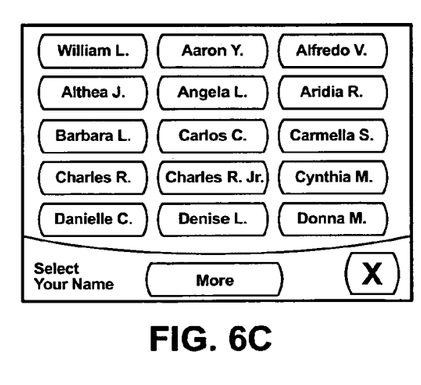

FIG. 6C is a graphical representation of another screen of the user interface of FIG. 6B, prompting a user for user identification input. The user interface may prompt for a user to select his identity from a list of possible or authorized users, or alternatively could request the input of a user identification code and/or password to continue the weighing event. When the user identification input is received, the user interface advances to the next screen.

Figure 6D:
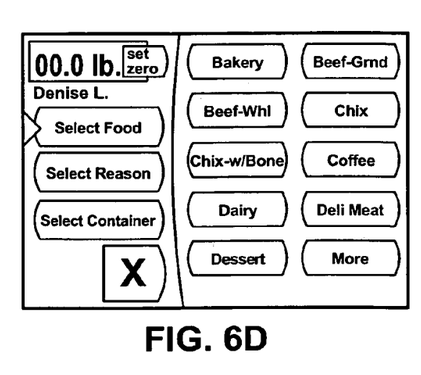

FIG. 6D is a graphical representation of yet another screen of the user interface of FIG. 6B, prompting for food type user input. The display area may also include an area that displays the identity of the user performing the weighing event. If the name is not correct, i.e., the user pressed the wrong user identification button of FIG. 6C, the cancel button represented by an "X" may be pressed to start the weighing event over, or alternatively return to a previous screen.

A user may select the correct food type for the waste as listed on the user interface. If the correct food type is not listed, the "More" button may be pushed to receive additional lists of alternative food types. When the food type input is received, the user interface may then advance to the next screen.

Figure 6E:
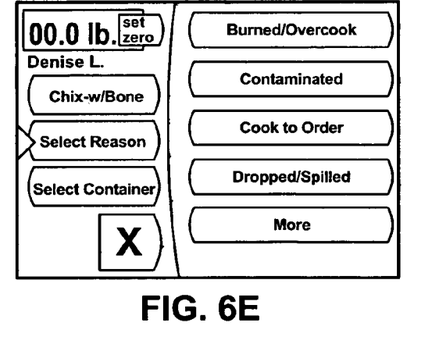

FIG. 6E is a graphical representation of yet another screen of the user interface of FIG. 6B, prompting for loss type or reason input. A user may select the correct loss type, i.e., reason for the food becoming food waste, from the reasons listed on the user interface. If the correct loss type or reason is not listed, the "More" button may be pushed to view additional loss types to choose from.

Figure 6F:
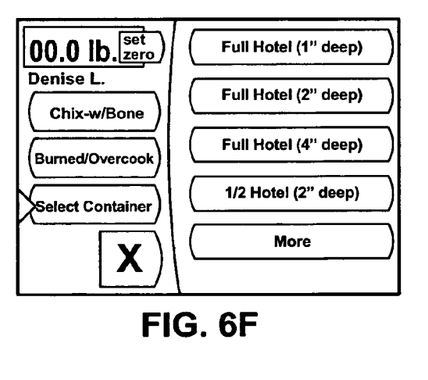

The user interface may include a process flow illustration comprising either a diagram, image, illustration, animation, set of characters or sketch which demonstrate where, in the midst of the weighing event, the user is currently positioned. An exemplary process flow illustration is shown in FIGS. 6D-F. The process flow illustration may include a chart with three icons, where each icon represents one step in the process of recording food waste, such as (1) select food type, (2) select reason or loss type, and (3) select container type. As the user moves through each step in the weighing event, an arrow cursor, or alternatively a highlight or other visual and/or audio marker, would identify the present step and illustrate the transition to the next step.

FIG. 6F is a graphical representation of another screen of the user interface of FIG. 6B, prompting for container type input. A user may select from a list, the correct container type in which the food waste is being weighed. If the correct container type is not listed, the "More" button may be pushed to view additional loss reasons/types to choose from.

Figure 6G:
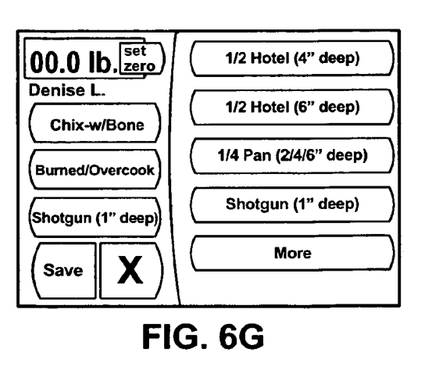

FIG. 6G is a graphical representation of still another screen of the user interface of FIG. 6B, prompting for confirmation of a completed weighing event. Once the container type input is received, as shown in FIG. 6F, the user inputs and food waste weight may be recorded by pressing the "save" button, and the weighing event is completed. Alternatively, additional forms of user input may be prompted for by the user interface. Also, the user interface may prompt the user to confirm whether a new weighing event is to take place.

According to another alternative user interface embodiment, a hard button-based interface having an array of membrane switches or mechanical buttons may be used. The buttons may be context sensitive and dedicated to various functions and meanings at different points in the process flow. Like the embodiment depicted in FIG. 6A, a user may receive direction or information via a display that presents instructions, prompts, data, and other administrative information.

The user interface may also include a voice prompt interface, wherein the local food waste monitoring device includes a speaker and provides audio instructions, data, and prompts to a user. The user may then press buttons to provide input in response. Alternatively, the user may speak instructions in response to the prompts, and the instructions may be collected via a microphone and interpreted to commands through voice recognition software installed on the monitoring device.

In order to minimize the amount of user input required, the monitoring device may use the placement and removal of weight on the scale to trigger prompts to the user. For example, as food waste is placed on the scale, the user may be prompted automatically for the food type. When the food type is received, the user is then prompted automatically for the loss type or reason. If the food waste is removed from the scale, the entire weighing event may be recorded without additional user input.

Various alternative user interface embodiments may be employed with the local food waste monitoring station as would be apparent to those having skill in the art. Examples may include the use of split screen layouts, dynamic presentation of frequently used user input types, sequential screens, use of images and photos instead of, or in combination with character text, etc.

FIG. 7 is a flow diagram of an embodiment of a method 700 for automatically deducting a container weight during a food waste weighing event. The method 700 for deducting container weights may be performed within a local food waste monitoring device, or in combination with a host device. The method 700 may include receiving 702 an indication of weight of each empty container type. This may be received 702 in the local monitoring device when an empty container is placed on the scale. All container types typically used to weigh food waste are weighed when empty. An average weight of each empty container type may be calculated 704 after multiple weighings of each particular container type. The weighted average weight per container type, i.e., the tare weight of each container type calculated 704 is stored 706 in a database. The database may be stored on the memory of the host device, as depicted in FIG. 1, or alternatively may be stored on the memory storage device of the local food waste monitoring device.

During a typical weighing event, the local food waste monitoring device receives 708 a total weight from an electronic scale representing both the food waste and the container in which it is weighed. A container type input may also be received 710 representing the kind of container in which the food waste was weighed. The method 700 then determines 712 whether the tare weight of the container type input received 710 from the database of tare weights exceeds the total weight registered on the electronic scale. If the tare weight for the container type does not exceed the total weight received 708 from the electronic scale, the container tare weight for the particular container type is subtracted 714 from the total weight. The resulting value after subtraction 714 represents the calculated food waste weight.

If it is determined 712 that the tare weight for the container type exceeds the total weight received 708, the local monitoring device may prompt 716 the user to provide an alternative container type input. The method 700 may further include a pre-defined time interval in which the method 700 will wait for an alternative container type input. After prompting 716 for an alternative container type input, it is determined 718 whether the alternative container type input is received within the pre-defined time interval. If an alternative container type input is received 710, the method proceeds to determine 712 whether the tare weight for the alternative container type selected exceeds the total weight received 708.

If it is determined 718 that the alternative container type input is not received within the pre-defined time interval, the food waste weight for this particular weighing event may be set 720 to a nominal value. This nominal food waste weight or the food waste weight calculated from subtracting 714 the container tare weight from the total weight received 708 may then be recorded 722 in a memory storage device. Accordingly, the method 700 for automatically deducting a container weight during a food waste weighing event provides for an expeditious data collection process, and requires less input from kitchen staff.

Figure 8:
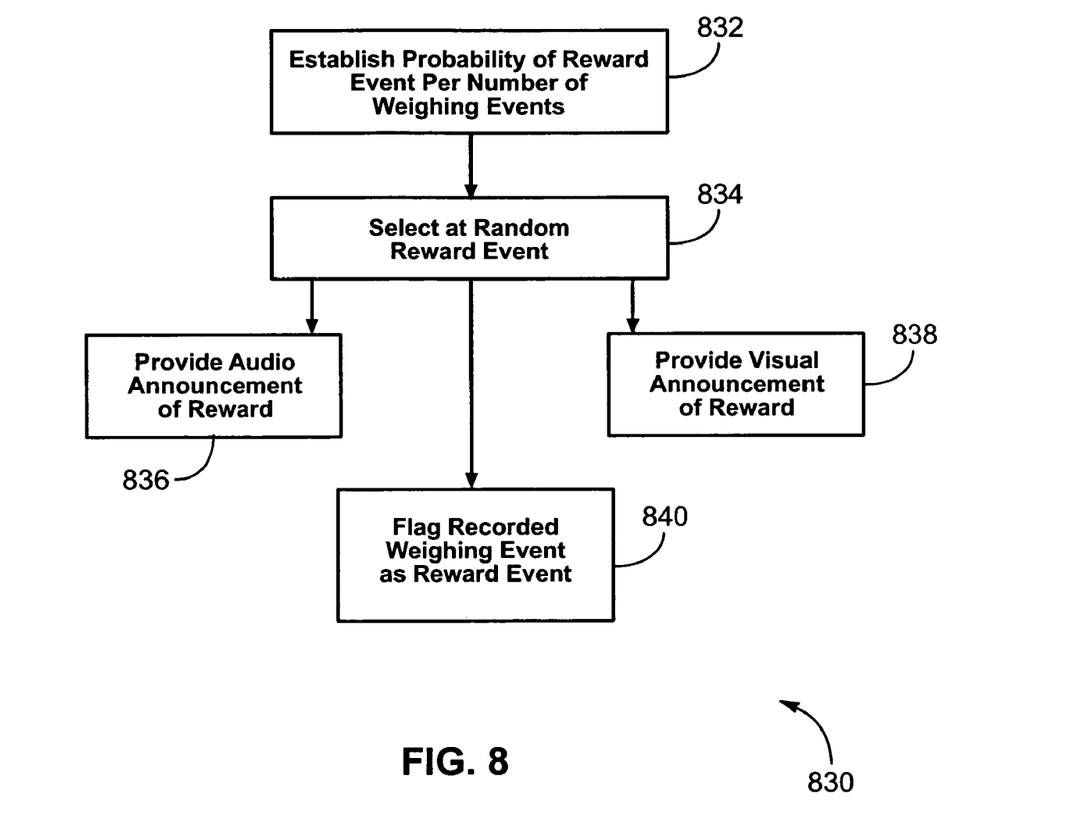
FIG. 8 is a flow diagram of one embodiment of a method for incentivizing compliance with food waste monitoring.

FIG. 8 is a flow diagram of one embodiment of a method 830 for incentivizing compliance with food waste monitoring. When implementing a food waste reduction plan, employee motivation to comply with the monitoring system employed may be desirable. Accordingly, the method 830 for incentivizing compliance provides a method for food service managers to motivate, incentivize and reward employee participation.

According to the embodiment depicted in FIG. 8, a probability is established 832 of a reward event occurring over a pre-defined number of weighing events. This probability may be inputted into a host device for establishing 832 the frequency of reward events. A reward event may be randomly selected 834 out of a number of weighing events. For example, a food service manager may decide to select a winner for every 25 weighing events. The food service manager inputs the desired frequency and the probability is established 832 that one out of every 25 weighing events will be randomly selected 834 as a reward event, or "instant win."

The method 830 may provide 836 an audio announcement of the reward event notifying the employee that he/she will be receiving a reward for complying with the food waste monitoring program. Alternatively, or in addition, the method 830 may provide 832 a visual announcement such as video, graphics or other visual indicia, such as printed text announcing of the reward event and notifying the employee that he/she will be receiving a reward. Moreover, the recorded weighing event may also be flagged 840 so that the food service manager may be notified that the employee should be rewarded.

Other steps or methods for incentivizing employee compliance with food waste monitoring may be applied in addition to or in lieu of the method 830 disclosed herein. Examples of alternative methods for incentivizing include the food service manager identifying a "mystery" food waste item, whereupon the employee weighing the most of that particular item over a time period is rewarded. Another example of motivating compliance may be providing positive messages in the form of text, audio, video or other images to encourage the use of the food monitoring device. A points system may also be used so that a food service manager may ascribe point values to specific weighing events, which increase an employee's points balance that may be redeemed for a reward or recognition.

The modules depicted in the methods and systems disclosed herein may be implemented using any suitable combination of hardware, software, and/or firmware. In certain embodiments, various modules may be combined or the functionality of certain modules may be divided among two or more modules.

While specific embodiments and applications of various methods and systems for food waste monitoring have been illustrated and described, it is to be understood that the invention claimed hereinafter is not limited to the precise configuration and components disclosed. Various modifications, changes, and variations apparent to those of skill in the art may be made in the arrangement, operation, and details of the methods and systems disclosed.

Furthermore, the methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified without departing from the scope of the invention as claimed.

The embodiments disclosed may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware.

Embodiments of the present invention may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention as claimed hereinafter.

What is claimed is:

1. A food waste monitoring system, comprising:
   an input module to receive an indication of a weight of a container including food waste placed upon an electronic scale;
   a user interface to receive an indication of a type of the container, a type of food being weighed, and a loss reason representing a reason for the food becoming waste;
   a database of tare weights for empty containers,
   a processing module to automatically subtract the empty container tare weight for the indicated container type from the indication of the weight provided by the electronic scale to calculate a weight of the food waste; and
   a storage module to store the calculated weight of the food waste and the indications of the food type and loss reason;
   wherein the user interface also receives an indication of an identity of a user placing the food waste on the scale, and
   wherein the user interface provides a request for an alternative indication of container type when the indication of container type received has a tare weight from the database greater than the indication of weight provided by the electronic scale.

2. The food waste monitoring system of claim 1, wherein the weight of food waste stored in the storage module is a nominal weight when the user interface does not receive the alternative indication of container type.

3. The food waste monitoring system of claim 1, wherein each empty container tare weight of the database of tare weights comprises an average weight of similar types of empty containers, determined by the processing module by sampling a plurality of weighings of similar types of empty containers and calculating the average weight.

4. A food waste management system, comprising:
a local food waste monitoring device in communication with an electronic scale to record a weight of food waste placed upon the scale, the local food waste monitoring device also for recording user selections of at least a food type from a food type list and a loss reason from a loss reason list; and
a host device in communication with the local food waste monitoring device, the host device for generating the food type list and loss reason list and transmitting the same to the local food waste monitoring device to enable user selection therefrom;
wherein the local food waste monitoring device is to receive and record an indication of an identity of a user placing food waste on the scale, and the host device is to generate a user list and transmit the same to the local food waste monitoring device.

5. The food waste management system of claim 4, wherein the local food waste monitoring device is to record user selections of a type of container in which the food waste is weighed from a container type list, and the host device is to generate the container type list and transmit the same to the local food waste monitoring device to enable user selection therefrom.

6. The food waste management system of claim 4, wherein the weight of food waste and the user selections recorded at the local food waste monitoring device are transmitted to the host device.

7. The food waste management system of claim 6, wherein the weight of food waste and the user selections recorded are aggregated over a period of time and transmitted to the host device in batch mode.

8. The food waste management system of claim 6, wherein the weight of food waste and the user selections recorded at the local food waste monitoring device are transmitted to the host device in real-time.

9. The food waste management system of claim 4, wherein the host device is in communication with the local food waste monitoring device through a removable memory device that is physically transported between the host device and the local device.

10. The food waste management system of claim 4, wherein the host device is in communication with a plurality of local food waste monitoring devices.

11. The food waste management system of claim 4, wherein the host device generates and transmits instructions for a configuration of a graphical user interface of the local food waste monitoring device.

12. A method for monitoring food waste in a food waste monitoring system, comprising:
receiving, at a local food waste monitoring station, input indicative of a weight of food waste placed on a scale;
prompting a user for input indicative of a reason for food becoming food waste, and at least one of: an identity of a user weighing the food waste, a type of food being weighed, and a type of container the food waste is weighed in;
transmitting data representative of the weight of food waste and the user input to a host device; and
receiving from the host device lists of possible user inputs for the user to select from at the food waste monitoring station, the lists selected from the group consisting of: a food type list of the type of food being weighed, a container type list of the type of container the food waste is being weighed in, a user identity list of the identity of the user weighing the food waste, and a loss reason list of the reasons for food becoming food waste.

13. The method of claim 12, further comprising:
extrapolating, at the host device, the weight of food waste and the food type into a monetary value; and
providing, at the host device, a report summarizing the monetary value of food waste generated over a time interval.

14. The method of claim 12, further comprising providing, at the host device, a report comparing the user input over different time intervals.

15. The method of claim 14, wherein the user input is selected from the group consisting of: the food type, the user identity, and the loss reason.

16. The method of claim 12, further comprising recording onto a memory device the user input, food waste weight, and an indication of a date and time of a weighing event.

17. A machine-readable medium including program code, which, when executed by a machine, causes the machine to:
receive input indicative of a weight of food waste placed on a scale;
prompt a user for and receive input indicative of at least one of: an identity of a user weighing the food waste, a type of food being weighed, and a type of container the food waste is weighed in;
prompt a user for and receive input indicative of a reason for food becoming food waste;
transmit data representative of the weight of food waste and the user input to a host device; and
receive from the host device lists of possible user inputs for the user to select from at the food waste monitoring station, the lists selected from the group consisting of: a food type list of the type of food being weighed, a container type list of the type of container the food waste is being weighed in, a user identity list of the identity of the user weighing the food waste, and a loss reason list of the reasons for food becoming food waste.

18. The machine-readable medium of claim 17, wherein to transmit data to the host device comprises transmitting data to the host device in real-time over a network.

19. A food waste management system, comprising:
a local food waste monitoring device in communication with an electronic scale to record a weight of food waste placed upon the scale, the local food waste monitoring device also for recording user selections of at least a food type from a food type list and a loss reason from a loss reason list; and
a host device in communication with the local food waste monitoring device, the host device for generating the food type list and loss reason list and transmitting the same to the local food waste monitoring device to enable user selection therefrom;
wherein the local food waste monitoring device is to record user selections of a type of container in which the food waste is weighed from a container type list, and the host device is to generate the container type list and transmit the same to the local food waste monitoring device to enable user selection therefrom.

* * * * *